US007631096B1

(12) United States Patent
Yeh et al.

(10) Patent No.: US 7,631,096 B1
(45) Date of Patent: Dec. 8, 2009

(54) REAL-TIME BANDWIDTH PROVISIONING IN A SWITCHING DEVICE

(75) Inventors: Chiang Yeh, Sierra Madre, CA (US); Dennis Weaver, Spokane, CA (US)

(73) Assignee: Alcatel Lucent, Paris (FR)

( * ) Notice: Subject to any disclaimer, the term of this patent is extended or adjusted under 35 U.S.C. 154(b) by 1378 days.

(21) Appl. No.: 10/684,772

(22) Filed: Oct. 14, 2003

Related U.S. Application Data (60) Provisional application No. 60/418,111, filed on Oct. 11, 2002.

(51) Int. Cl.
*G06F 15/16* (2006.01)
(52) U.S. Cl. .................. 709/235; 709/224; 709/232; 370/231
(58) Field of Classification Search .............. 370/229, 370/250, 509, 414, 252, 231; 709/222, 235, 709/232, 224; 455/422; 702/186
See application file for complete search history.

(56) References Cited

U.S. PATENT DOCUMENTS

| 5,859,835 | A  | * | 1/1999  | Varma et al. ............... 370/229 |
| 6,058,102 | A  | * | 5/2000  | Drysdale et al. ............ 370/252 |
| 6,643,612 | B1 | * | 11/2003 | Lahat et al. ................ 702/186 |
| 7,027,457 | B1 | * | 4/2006  | Chiussi et al. .............. 370/414 |
| 7,257,134 | B2 | * | 8/2007  | Yik et al. ................... 370/509 |
| 2002/0055356 | A1 | * | 5/2002  | Dulin et al. ................ 455/422 |
| 2003/0033394 | A1 | * | 2/2003  | Stine ......................... 709/222 |
| 2003/0076784 | A1 | * | 4/2003  | Ta et al. .................... 370/250 |
| 2004/0213155 | A1 | * | 10/2004 | Xu et al. ................... 370/232 |

* cited by examiner

*Primary Examiner*—Jungwon Chang
(74) *Attorney, Agent, or Firm*—RG & Associates LLC (57) ABSTRACT

A method and apparatus for provisioning bandwidth among a plurality of queues in a switching device are disclosed. The bandwidth provisioning employs a QoS label with a timestamp to determine the queue delay associated with the transmission of the packet from an ingress switching device, e.g. ingress blade, to an egress switching device, e.g. egress blade. The QoS label is applied on the ingress blade and removed and read on the egress blade. Using the timestamp, the switch can identify congested priority queues at the ingress blade and selectively enable fragmentation for purposes of preventing particular packets and or particular flows from consuming disproportionately large system resources including bandwidth necessary to communicate packets through the switch fabric. Some QoS labels may further include instruction sets and a fragmentation identifiers used by the egress blade to reassemble the packet fragments. The QoS label, in cooperation with computational and management resources, provide a feedback mechanism to perform real-time bandwidth provisioning within a switch.

23 Claims, 6 Drawing Sheets

REAL-TIME BANDWIDTH PROVISIONING IN A SWITCHING DEVICE

CROSS-REFERENCE TO RELATED APPLICATION

This application claims priority from the following U.S. Provisional Patent Application, the disclosure of which, including all appendices and all attached documents, is hereby incorporated herein by reference in its entirety for all purposes: U.S. Provisional Patent Application Ser. No. 60/418,111, to Chiang Yeh and Dennis Weaver, entitled, "VIRTUAL REAL-TIME ENABLED SWITCHING IN LAYER-TWO ENTERPRISE SWITCHES," filed Oct. 11, 2002.

FIELD OF INVENTION

The invention relates to a packet switching device for performing real-time bandwidth provisioning. In particular, the invention relates to an apparatus and method for implementing an internal label used to measure and correct various quality of service parameters including queue delay between an ingress blade and egress blade of a switching device.

BACKGROUND

Switches including Ethernet switches generally include numerous ports through which the switch receives and transmits data packets. These switches commonly include a plurality of switch modules with packet processors that operate at layer 2 and 3 of the Open Systems Interconnect (OSI) model but are capable of providing some layer 4 through 7 functionalities depending on the configuration. Operably coupling the various switch modules is a back plane comprising a switching fabric that provides a circuit-switched path linking each switch module to every other switch module. The switching fabric of the back plane is a store and forward device capable of storing packets until ready for output.

The bandwidth available to transfer packets between switching modules is limited. In order to regulate access to the switch fabric among the competing queues, packets are buffered at each of the ingress switching modules until a scheduler releases each of the packets from its queue. The queue memory in which the ingress packets are temporarily stored are generally categorized into a plurality of priority levels to provide higher levels of service to select traffic. In principle, the higher priority traffic is serviced prior to lower priority traffic, and time-critical flows transmitted through the switching fabric before less-critical traffic.

In practice, there are numerous bandwidth allocation schema for implementing queue prioritization, each with its own particular trade-offs. In strict priority, for example, a lower priority queue is only dequeued after all higher priority queues are empty, which can completely starve the lowest level queues. In a weighted fair queuing, each of the queues is assigned a weight indicating its relative importance to the other queues. Queues are then dequeued in a round robin fashion with each queue being allotted a percentage of the available bandwidth in proportion to its particular weight. In this manner, each of the queues is serviced with emphasis given to the highest priority queues.

As an unintended consequence of weighted fair queuing, some types of traffic in one or more queues can effectively exceed the prescribed upper bandwidth limits associated with a queue and effectively starve, albeit temporarily, other queues of their requisite bandwidth. A lower priority queue can starve the highest priority queue of bandwidth, for example, if the lower priority queue is permitted to monopolize the bandwidth by transmitting one or more relatively large packets to the switch fabric. Under these circumstances, the switching device may fall short of real time guarantees resulting in increased delay and jitter of high priority traffic. There is, therefore, a need for a switching device adapted to perform real-time traffic engineering on traffic flows of inter-blade traffic.

SUMMARY

The present invention features a method and apparatus for provisioning bandwidth among a plurality of queues in a switching device. The bandwidth provisioning method preferably comprises the steps of appending a QoS label comprising a timestamp to a PDU segment, either a inbound PDU or fragment of the inbound PDU, at a first switching device; buffering the PDU segment in one of the plurality of queues; conveying the PDU segment to a second switching device; determining the delay for the PDU segment to propagate between the first switching device and the second switching device; and altering at least one of the one or more queueing properties at one or more queues depending on the delay observed. A PDU fragment is a fractional portion of a PDU that is generated by parsing an inbound PDU. In the preferred embodiment, fragmentation is used to prevent a PDU or a flow, for example, from monopolizing the queue resources necessary to transmit PDUs from an ingress switching device to an egress switching device, thereby making bandwidth available to other priority queues.

The queueing properties, in the preferred embodiment, are used to indicate whether to enable subsequent PDUs or traffic flows to be fragmented for the purpose of adjusting the allocation of bandwidth necessary to communicate PDUs between the first switching device and a second switching device. The queueing properties may also be used to determine the length into which PDUs are fragmented, thereby offering a means to make fine adjustments to the bandwidth allocation scheme.

The bandwidth provisioning method preferably includes further steps for removing the QoS label at the second switching device and reassembling the plurality of PDU fragments into at least one protocol data unit (PDU) at the second switching device.

The bandwidth provisioning apparatus of the preferred embodiment comprises a first switching device, comprising a plurality of queues with associated queueing properties, for appending a timestamp to one or more PDU segments at a first switching device; and a second switching device, operatively coupled to the first switch device, for altering the length of one or more PDU segments buffered at one or more queues of the plurality of queues depending on the time for the one or more PDU segments to propagate between the first switching device and the second switching device.

BRIEF DESCRIPTION OF THE DRAWINGS

The present invention is illustrated by way of example and not limitation in the figures of the accompanying drawings, and in which.

DETAILED DESCRIPTION

Figure 1:
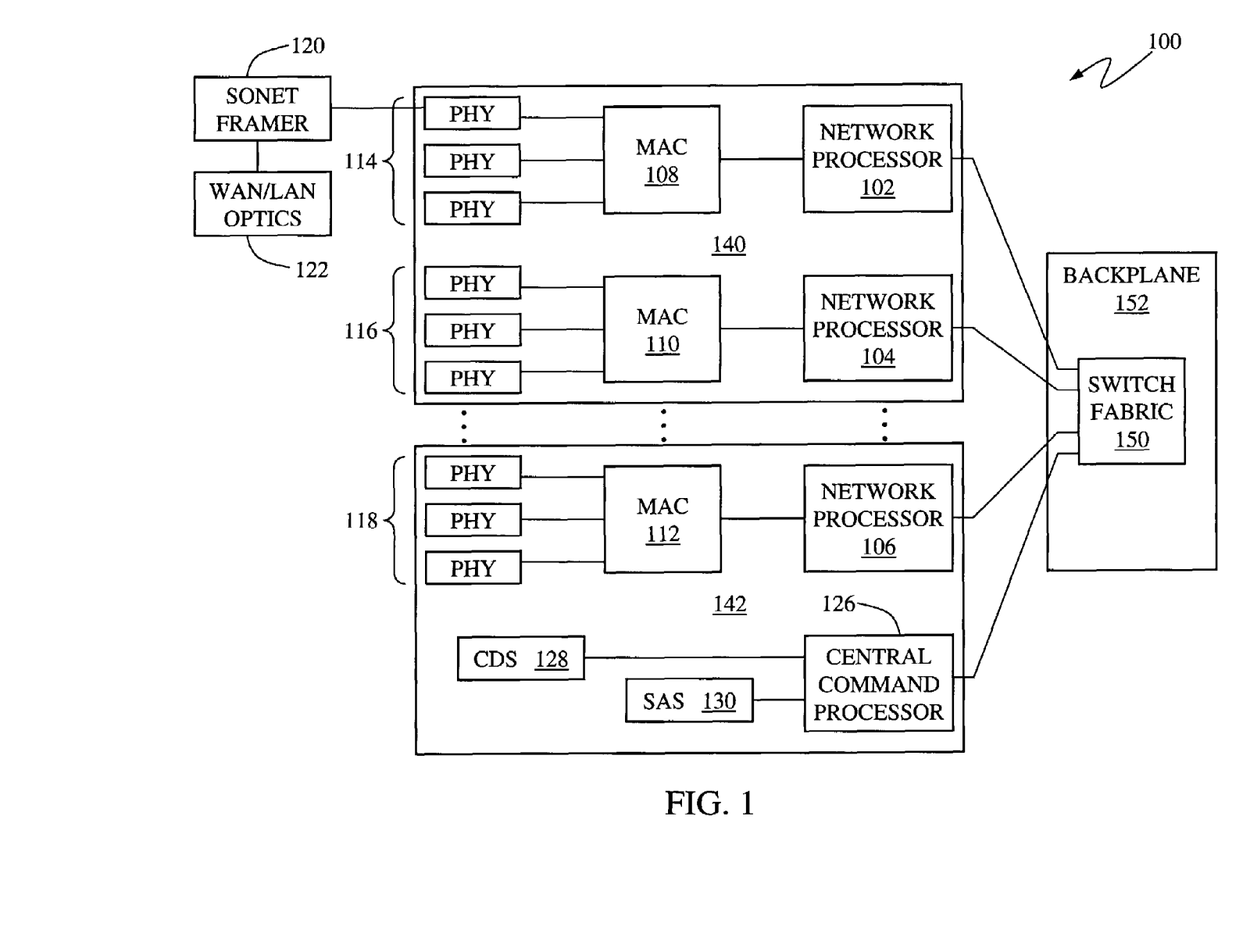
FIG. 1 is a functional block diagram of bandwidth-provisioning switching device, according to the preferred embodiment of the present invention.

Illustrated in FIG. 1 is a functional block diagram of an enterprise switch comprising a system of switch ports and a switch fabric. The enterprise switch 100 is one of a plurality nodes and other addressable entities operatively coupled to a communications network such as an Internet Protocol (IP) network embodied in a local area network (LAN), wide area network (WAN), or metropolitan area network (MAN), for example. The enterprise switch 100 preferably comprises a plurality of switching devices 140, 142 operatively coupled to one another by means of a switch fabric 150. A switching devices may take the form of a switch preprocessor, switch postprocessor, or blade embodied in a module adapted to engage a slot in the enterprise switch chassis that operatively couples the blade to a backplane 152.

Each of the plurality of switching devices 140-142, or blades, preferably comprises one or more network processors 102-106 generally capable of, but not limited to, at least layer 2 and layer 3 switching operations as defined in the OSI network model. Each of the blades 140, 142 is adapted to transmit and receive packet data to and from the network via communications links (not shown) and to and from one another by means of the switch fabric 150.

For purposes of this application, data flowing into a blade, i.e. a switch module, from a communications link toward the fabric 150 is referred to herein as ingress traffic comprising ingress protocol data units (PDUs), and the switching device through which ingress data propagates is generally referred to as the ingress switching device.

Furthermore, data flowing from the fabric 150 to a communications link is referred to as egress traffic comprising egress PDUs, and the switching device through which it propagates is referred to as an egress switching device. Each of the plurality of switching devices of the present embodiment can serve as both an ingress switching device and an egress switching device depending on the direction of the traffic.

In the preferred embodiment, the switching device is a IEEE 802.3-enabled switch employing one or more media access control (MAC) devices 108-112 and one or more physical layer receivers/transceivers 114-118 operably coupling the enterprise switch 100 to a plurality of wired and/or wireless communications links including, for example, a WAN/LAN optical transceiver 122 by means of the sonnet framer 120.

In the preferred embodiment, the enterprise switch 100 further includes a central command processor 126 for monitoring and managing various system resources including a configuration database storage (CDS) 128 and statistics and accounting storage (SAS) 130. The central command processor 126 preferably resides on one of the plurality of switching devices.

Figure 2:
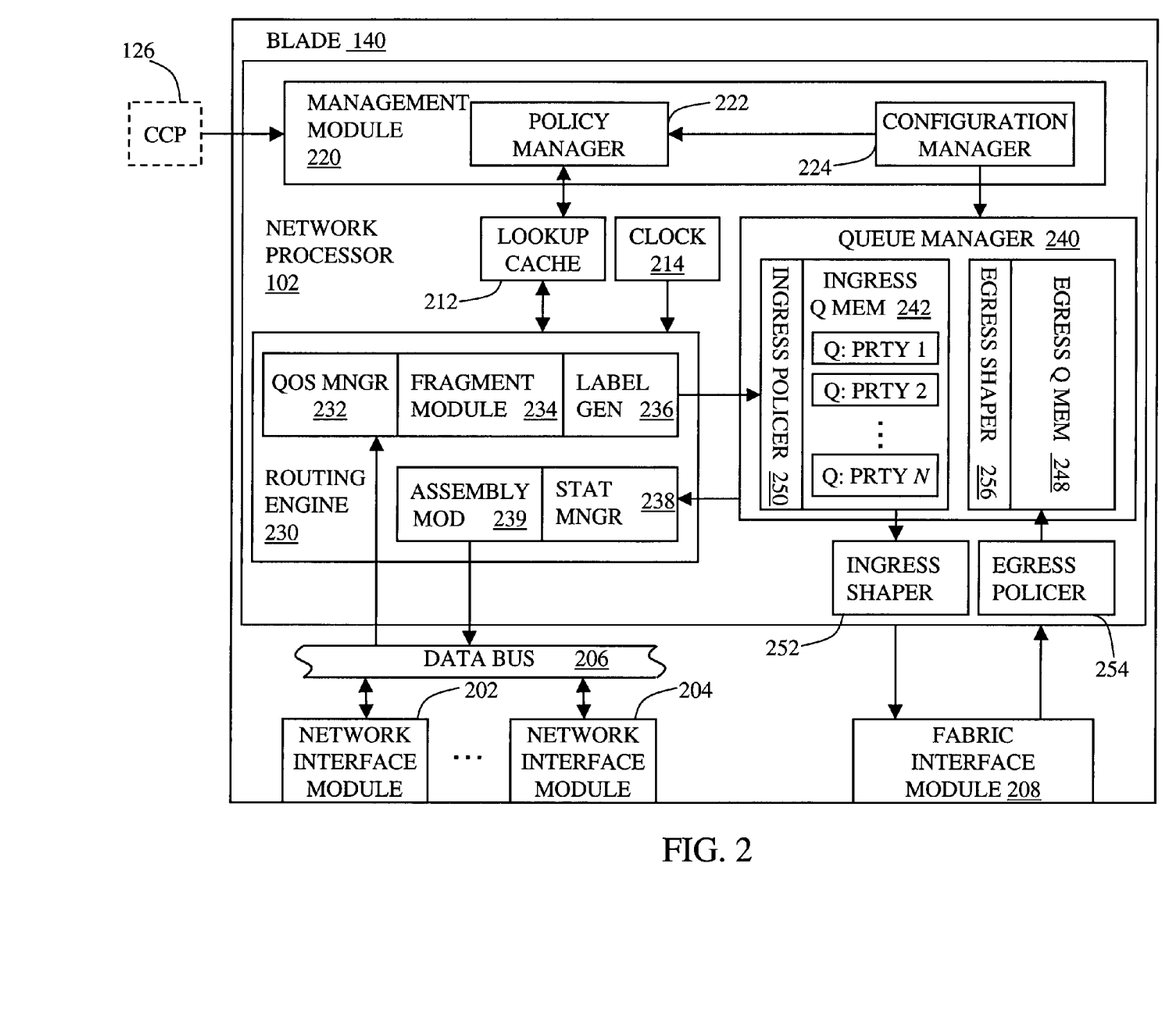
FIG. 2 is a functional block diagram of a switching module, according to the preferred embodiment of the present invention.

Illustrated in FIG. 2 is a functional block diagram of a representative switching device. The switching device 140 comprises a plurality of network interface modules (NIMs) 202, 204, one or more network processors 102, and a fabric interface module 208. Each of the NIMs 202, 204 is operatively coupled to an external port for purposes of receiving and transmitting data traffic. The NIMs are preferably Ethernet-enabled ports comprising one or more physical 114 interfaces and one or more media access control (MAC) interfaces 108. Both ingress and egress PDUs are then exchanged between the blade 140 and the plurality of NIMs 202, 204 by means of one or more internal data busses 206.

The network processor 102 in the preferred embodiment comprises a management module 220, a routing engine 230, and a queue manager 240. The management module 220 generally comprises a policy manager 222 for retaining and implementing policy rules, including QoS policy, provided by the central command processor (CCP) 126 and/or a network administrator via the configuration manager 224. An internal copy of the policy rules are preferably retained in high speed look-up cache 212 for purposes of providing real-time support for the routing engine 230 operating a wire speeds.

The routing engine 230 of the preferred embodiment is adapted to receive ingress data from the NIMs 202, 204, parse the data, perform address look up from cache 212, and process the individual PDUs for either layer 2 switching or layer 3 routing, for example, prior to forwarding the PDU to the queue manager 240. The queue manager 240 preferably prioritizes and buffers the ingress traffic in ingress memory 242 prior to forwarding it to the fabric interface module 208. The ingress memory 242 comprises a plurality of queues of differing priority for purposes of providing class of service (CoS)/quality of service (QoS). In some embodiments, the switching module 140 further includes an ingress policer 250 for selectively filtering data prior to being enqueued at ingress queue memory 242 and/or an ingress shaper 252 for selectively filtering data prior to being forwarded to the switch fabric 150.

In this embodiment, the fabric interface module 208 also receives egress data from the fabric 150 that is generally buffered in egress queue memory 248, conveyed through the routing engine 230 for statistical processing, for example, and transmitted on the appropriate egress port via one of the NIMs 202, 204. In some embodiments, the switching module 140 further includes an egress policer 252 for selectively filtering data prior to being enqueued in egress memory 248 and/or an egress shaper 256 for selectively filtering data prior to being forwarded to the routing engine 230.

As discussed in more detail below, a PDU label is used to convey QoS properties including transit time information, fragmentation information between the ingress switching device and egress switching device to increase the efficiency and throughput of the enterprise switch 100. In some embodiments, the QoS properties may further include policing/shaping information with which the ingress switching devices may selectively enable policing and/or shaping of the ingress or egress traffic streams.

In addition to the conventional switching and routing systems, the routing engine 230 of the preferred embodiment further comprises a QoS manager 232, a fragmentation module 234, a label generator 236, a statistics manager 238, and an assembly module 239. The QoS manager 232 oversees the fragmentation of select ingress PDUs and the labeling of those PDUs for purposes of performing real-time bandwidth provisioning. This includes tracking or otherwise monitoring one or more signals from the CCP 126 indicating when to enable or modify the fragmentation operation, which of the one or more ingress queues or ingress traffic flows on which to enable or modify fragmentation, and the fragmentation parameters such as the maximum fragment size into which to divide a PDU.

The fragmentation module 234 is preferably adapted to parse select ingress PDUs into one or more PDU fragments that are forwarded to the fabric 150. PDU fragments have a QoS label appended to them by the label generator 236 prior to being enqueued. While a QoS label may also be appended to the unfragmented PDUs, the label applied to PDU fragments may further include a fragment identifier or sequence number for purposes of reconstructing or otherwise restoring the original packet at the egress switching device. After the label generator 236, the PDU segments, including both labeled PDUs and labeled PDU fragments, are transmitted to the queue manager 240 where they are buffered and scheduled for output.

In generally, the switching device 140 is adapted to enable fragmentation of PDUs primarily when one or more queues are adversely impacted due to high bandwidth consumption at one or more other ingress priority queues. Various metrics including inter-module delay, packet size variation, traffic throughput, and packet queue depth, for example, may be used to evaluate the real-time performance for every flow of traffic. Although the degree to which ingress traffic is fragmented is an implementation issue largely dependent on policy defined by the network administrator, a significant portion of the ingress traffic is generally not fragmented by the enterprise switch 100.

The ingress PDUs and PDU fragments generated by the routing engine 120 are conveyed to the queue manager 240 and buffered in one of a plurality of priority queues of ingress queue memory 242. Each of the N priority queues of the ingress queue memory 242 is associated with a different level of priority and correlates with a unique CoS or QoS level. In the preferred embodiment, there are N=4 priority queues for each of the ingress ports of the switching device 140, although this is subject to variation depending on the application. PDUs and PDU fragments are enqueued, using a prioritization scheme such as strict priority or weighted fair queuing in a modified form discussed in more detail below.

One skilled in the art will appreciate that the functional entities, including the fragmentation module 234 and assembly module 239 for example, may be incorporated into the queue manager 240 instead of the routing engine 230 while still preserving the benefits of the present invention. One skilled in the art will also appreciate that the routing engine 230 is one of a class of processing resources with which the present invention may be practiced. Alternative processing resources include traffic classifiers, rate policers, accounting devices, editing devices, and address look-up devices.

Figure 3:
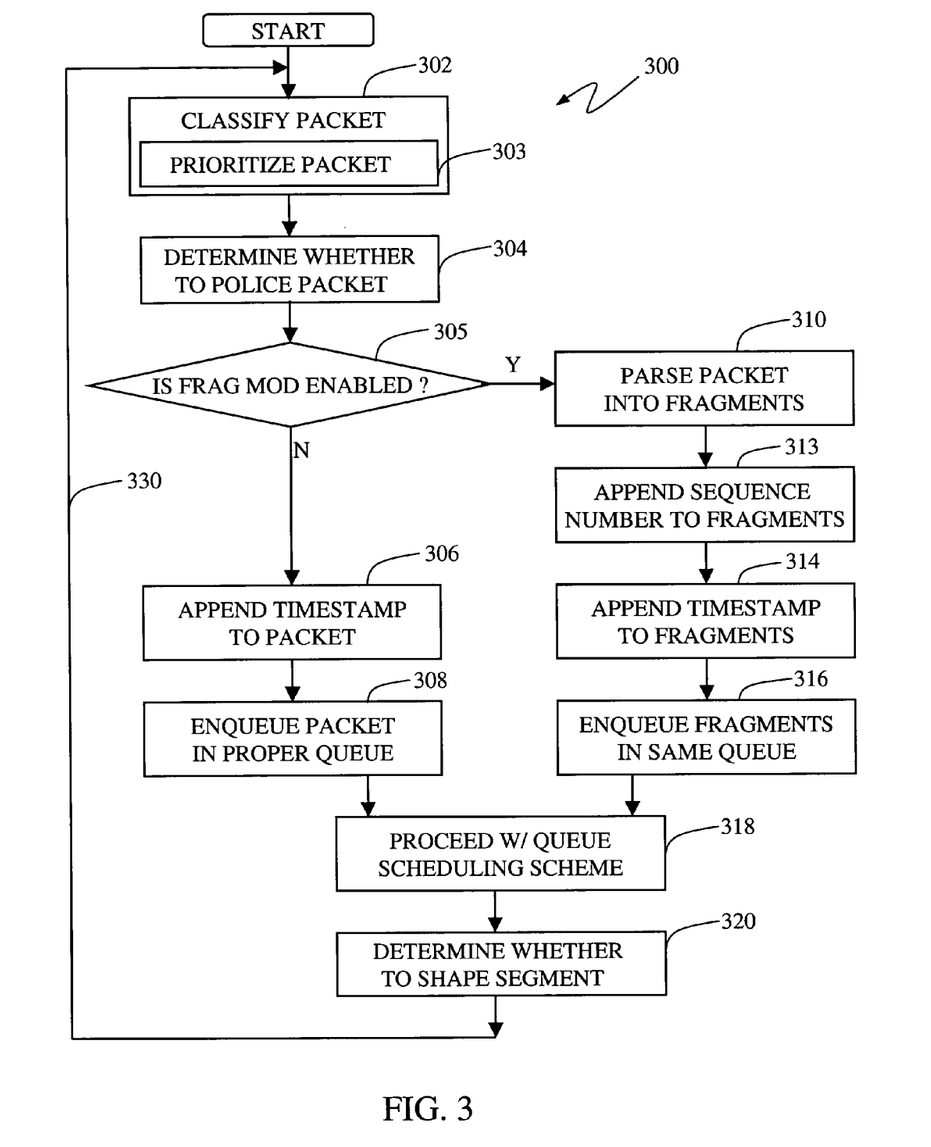
FIG. 3 is a flow chart of the method of performing real-time bandwidth-provisioning at an ingress switching module, according to the preferred embodiment of the present invention.

Illustrated in FIG. 3 is a flow chart of the method of performing real-time bandwidth provisioning with an ingress switching device. In the preferred embodiment, the real-time bandwidth-provisioning is implemented by fragmenting selected ingress PDUs on an ingress switching device to prevent PDUs of a particular priority queue from inadvertently consuming a disproportionately large amount of bandwidth at the expense of other priority queues.

As indicated by the classification step 302, the policies 212 are applied and an ingress PDU assigned to one of the plurality of priority queues of ingress queue memory 242, effectively prioritizing (step 303) the PDU for purposes of providing some QoS or CoS. In some embodiments, the PDU or PDU fragment may be selectively filtered by the ingress policer 250 prior to committing the PDU in memory 242. Whether the ingress switching device 140 proceeds to parse the PDU into a plurality of PDU fragments, as determined in fragmentation testing step 305, depends on whether fragmentation is enabled by the CCP 126. The decision at the CCP 126 whether to enable fragmentation on a particular priority queue or flow, for example, is preferably made in consideration of traffic systemic patterns present across at each of the switching devices coupled to the switch fabric 150. In generally, the decision to enable fragmentation is made in real-time based upon a statistical feedback system monitoring the transit time from ingress blade to egress blade. When enabled, fragmentation preferably occurs contemporaneously with or subsequent to layer 2 and layer 3 processing of incoming packets from the one or more ingress ports.

Each of the plurality of priority queues 1-N in ingress queue memory 242 is associated with a different priority level, each priority level correlating with one or more CoS or QoS levels. Each of the one or more QoS levels is defined by one or more policies governing the transmission of PDUs through the node. The policies may set forth bandwidth requirements, maximum jitter, queue delay, transit delay, and the preference and frequency with which packets are distributed to the switch fabric 150, for example.

In the preferred embodiment, ingress PDUs are distributed to one of four priority level queues per port per switching device. The highest priority queue is dedicated to the highest class of service, which generally prescribes a minimum bandwidth and/or a minimum queue delay, for example. The type of traffic serviced by the highest priority queue generally includes voice communications and video transmissions which require minimal latency. The remaining priority queues have progressively lower levels of priority corresponding to lower levels of service. PDU and PDU fragments in the lowest priority queue, the default queue, have no service guarantees and are distributed to the switch fabric 150, in the case of strict priority queuing, only when the higher priority queues are empty.

While the switch fabric 150 may also include memory for buffering PDUs being transmitted from the ingress switching device to the egress switching device, the switch fabric 150 does not give preferential treatment to any PDU, regardless of its priority. The primary purpose of the switch fabric 150 is simply to deliver packets from one traffic manager to another and to, perhaps, filter traffic when the fabric's internal queues reach capacity. The filtering performed by the switch fabric 150 is, therefore, based on the volume of traffic received rather than the class or priority of the traffic. The preferred embodiment of the present invention overcomes this problem and other problems by introducing a feedback mechanism accessible to all the ingress queue managers attached to the same switching fabric 150.

In the absence of excessive bandwidth consumption problem, the fragmentation module 234 is disabled and the fragmentation testing step 305 answered in the negative. When disabled, the ingress PDU is sent to the ingress queue 242 where it is appended with a QoS label comprising a time stamp (step 306). The time stamp, which is used to quantify the throughput of each of the queues, may be the actual time or some standard used for reference internal to the switching device. The packet with QoS label is then buffered enqueuing step 308 at the priority queue determined in classifying step 302.

If the fragmentation module 234 is enabled by the CCM 126 for the PDU, the fragmentation testing step 305 is answered in the affirmative and the PDU parsed into one or more PDU fragments in fragmenting step 310. Each of the selected PDUs is divided in parsing step 310 into a plurality of PDU fragments. PDU fragmentation is generally required when one or more queues associated with the particular ingress port are being under serviced. Since a PDU fragment is a smaller quantum of data than the original PDU, fragmentation prevents a particular priority queue from monopolizing the channel between the ingress queue 242 and the switch fabric 150 for the period of time necessary to transmit the entire PDU. Fragmentation of PDUs of a particular priority queue can, therefore, reduce the queue delay in other priority queues by make the bandwidth to the fabric 150 available sooner than without fragmentation.

The selection of PDUs for fragmentation may be implemented using one or more approaches either alone or in combination. In a first approach, fragmentation is enabled on a per flow basis for one or more ingress flows. Fragmentation may be triggered, for example, when one or more traffic flow metrics exceeds an associated threshold. In a second approach, PDUs are selected for fragmentation on a packet-by-packet basis as a function of various parameters including, for example, the PDU length or the current level of congestion in one or more ingress priority queues 242. In a third approach, fragmentation is enabled for a fractional packet, i.e. the remainder of a PDU still buffered at the ingress queue memory 242 after transmission to the fabric 150 has begun but before completion of transmission. In a fourth approach, fragmentation is enabled for all ingress PDUs assigned to a congested priority queue at the ingress queue memory 242. In a fifth approach, fragmentation is enabled for PDUs from lower priorities queues that are destined to the congested switch fabric queues (not shown). In a sixth approach, PDUs destined to a congested egress queue are fragmented to relieve congestion at the destination egress switching device.

In the preferred embodiment, the one or more PDUs that are selected for fragmentation are divided into a plurality of substantially equal-length PDU fragments. In general, the PDU should be divided into the minimum number of PDU fragments necessary to achieve a desired result. If the desired result is a maximum jitter, for example, the maximum size PDU fragment must be small enough that time required to output the PDU fragment to the fabric 150 is less than the maximum delay of the higher priority queue. If a high priority queue had a maximum queue delay of 10 millisecond, for example, the maximum size fragment in a system with a 1 gigabit per second switch fabric would be restricted to 1.25 kbytes. While the actual number and size of a PDU fragments may be subjectively determine on a per packet or per flow basis, the more congested the network the smaller the fragmentation size, as a general rule.

A simple formula for calculating a suitable fragmentation size is as follows: Current Fragmentation Size=(Maximum Frame Size)/Max[(Current Delay/Acceptable Delay), 1]. In this example, fragmentation is generally enabled when Current Delay is greater than Acceptable Delay. One skilled in the art will recognize, however, that this is only one of numerous ways for calculating an optimal PDU fragment length.

In some embodiments, each of the PDU fragments is assigned a fragment identifier, such as a sequence number, in the numbering step 313 to facilitate the reconstruction of the fragmented PDU at the egress switching device. The sequence number or a pointer thereto is preferably incorporated into a QoS label in conjunction with a time stamp appended to the PDU fragment (step 314). The PDU fragments with QoS label are then enqueued in the ingress queue memory 242 as illustrated in enqueuing step 316. In the preferred embodiment, each of the fragments derived from a common PDU is assigned to a common priority queue in enqueuing step 316 in sequential order from the start of the packet to the end.

As illustrated in the queue scheduling step 318, both PDUs and PDU fragments are then distributed to the fabric 150 using some scheduling algorithm such as strict priority or weighted fair queuing, for example. For purposes of the scheduling algorithm, there is no distinction between PDUs and PDU fragments. As illustrated by return path 330, the ingress blade 140 repeats the QoS provisioning process 300 for each successive PDU of each ingress port destined for the switch fabric 150.

In some embodiments, an egress blade monitoring the QoS labels from the ingress blade may also provide feedback with which the ingress blade can selectively filter (step 320) the PDU or PDU fragment at the ingress shaper 252.

Figure 4:
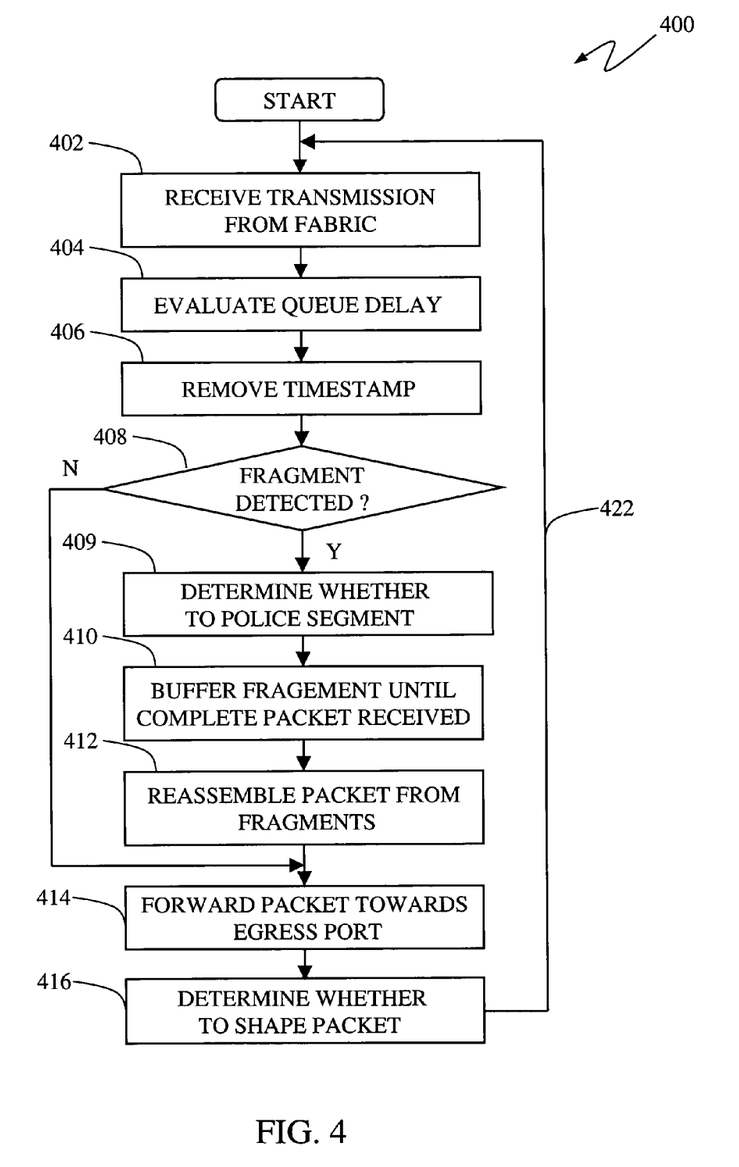
FIG. 4 is a flow chart of the method of performing real-time bandwidth-provisioning at an egress switching module, according to the preferred embodiment of the present invention.

Illustrated in FIG. 4 is a flow chart of the method of performing real-time bandwidth processing at an egress switching device. The switching device 140 in the preferred embodiment, which is adapted to process both ingress and egress traffic, serves as both an ingress switching device and an egress switching device depending on the PDU and its direction of flow. For purposes of discuss below, reference is made to the egress switching device, blade 140, with the understanding that it is structurally identical to the ingress switching device 140, but generally a different device than the ingress switching device.

First, the egress switching device 140 receives a PDU segment from the switch fabric 150, as illustrated in egress PDU receiving step 402. A PDU segment as termed herein includes both intacted PDUs as well as PDU fragments whether or not they include a QoS label. Upon receipt, the egress switching device 140 conveys the egress PDU segment to the statistical manager 238 of the routing engine 230 where the timestamp of the QoS label is read. The statistical manager 238 is a computational entity that serves, in part, to acquire some of the statistical figures necessary to decide whether to maintain the enable/disable or alter the fragmentation module signal seen on one or more ingress blades. The statistical manager 238 generally determines relative time between successive PDU segments, although it may also compare the current time from clock 214 to the timestamp in order to evaluate the queue delay (step 404). While the queue delay is intended to represent the period of time that a PDU segment is buffered in the ingress queue memory 242 on the ingress switching device, it may further include propagation delay associated with the transmission through the switch fabric 150. Removal of the QoS label (step 406) may occur prior to, subsequent to, or contemporaneously with the queue delay evaluation (step 404).

If a particular PDU segment from the fabric 150 is an unfragmented PDU the fragment detecting step 408 is answered in the negative and the PDU forwarded (step 414) through the egress switching device 140 to the appropriate egress port. If, however, the PDU segment is identified as a PDU fragment, and it is not filtered by the egress policer 409, the PDU fragment is buffered (step 410) until each of the fragments of the original PDU are received. Although each of the PDU fragments of a PDU are received in the order in which they were transmitted, receipt of the PDU fragments may be interleaved with other PDU segments corresponding to other priority queues and other ingress switching devices.

Once each of the PDU fragments of a PDU are received, the PDU is reassembled (step 412) at the assembly module 239 and then forwarded to the appropriate egress port 202, 204 in the same manner as the unfragmented PDU. The reassembly of the PDU (step 412) in the preferred embodiment constitutes a complete restoration of the PDU, which is then indistinguishable from the original PDU prior to fragmentation (step 310). The egress QoS provisioning process 400 is repeated by way of a return path 422 for each PDU segment from the switch fabric 150.

In some embodiments, the switching device is further adapted to filter the PDU at the egress shaper 256 after the PDU is buffered at the egress queue memory 248 prior to being transmitted from the egress port. The decision whether to filter the PDU may be based in part on feedback timing information derived from the QoS label.

Figure 5:
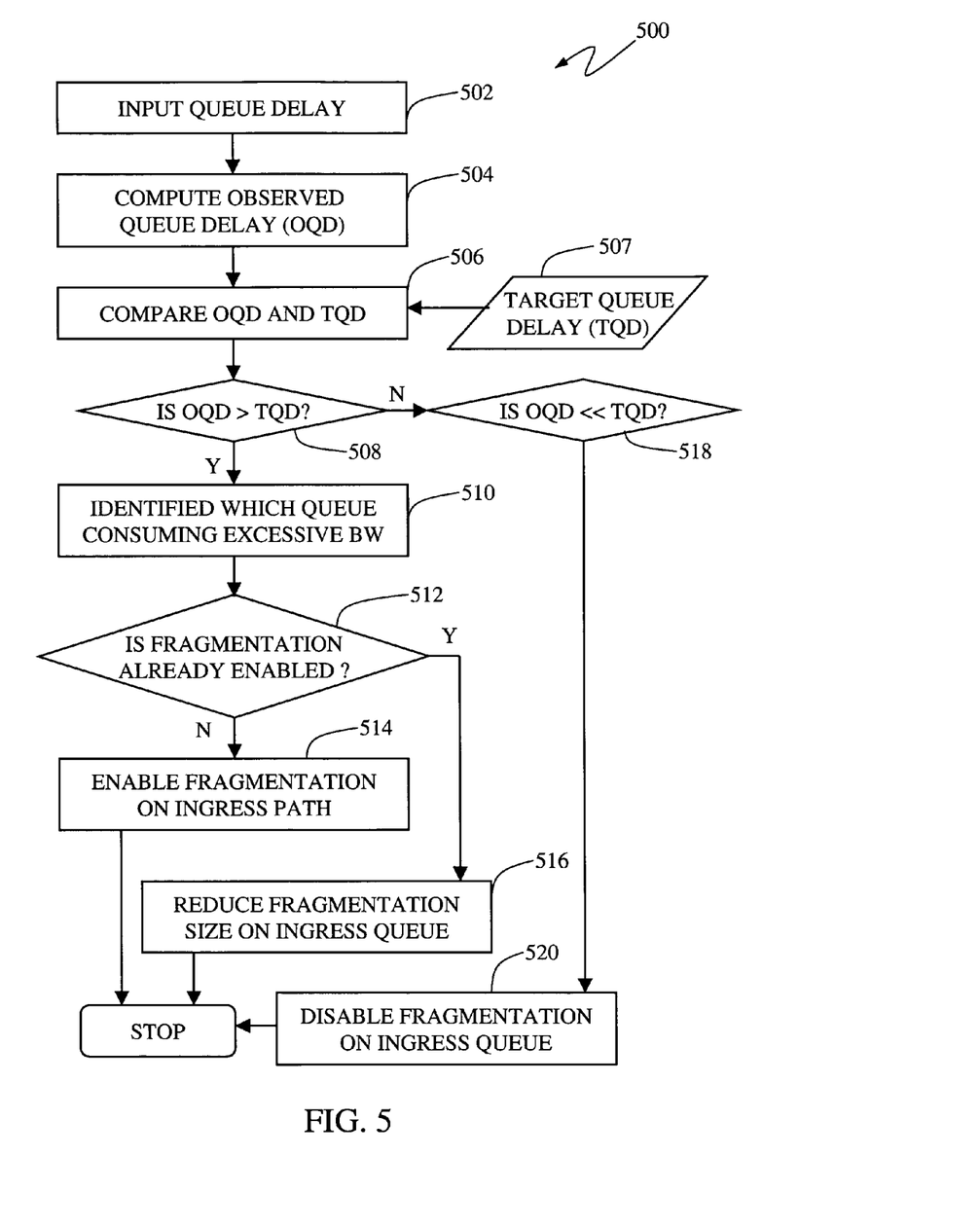
FIG. 5 is a flow chart of the method of evaluating the queue delay, according to the preferred embodiment.

Illustrated in FIG. 5 is a flow chart of the method of evaluating the queue delay. As a illustrated in the first step, the time stamp extracted from the QoS label, i.e. QoS header, is provided as input (step 502) to a statistical manager 238. The purpose of the statistical manager 238 is to determine the queue delay from one or more ingress queues necessary to assess efficacy of the fragmentation scheme or schema at one or more ingress blades. The timestamp from the QoS header is referred to herein as the origination time, which represent a common point of reference with which to measure the QoS performance.

Using the origination time, the statistical manager computes an observed queue delay (OQD). The OQD as used herein comprises the actual delay necessary to buffer a PDU or PDU fragment on the ingress switching device and transmit it to the egress switching device. In some embodiments, the OQD is the difference between the origination time and the time of receipt at the egress blade, and is computed for each individual PDU segment. In other embodiments, however, the OQD is computed from a statistical weighted average of a plurality of PDU segments received from a given ingress queue of a given priority level within a predetermined observation interval. Irrespective of the means of computation, a OQD is determined, in the preferred embodiment, for each priority level of each of the ingress queues of each of the ingress switching devices so as to provide a quantitative measure of the current delay experienced across the entire enterprise switch 100.

In the alternative to the OQD, the switching device 140 in some embodiments generates a queue delay expectancy (QDE). The QDE as used herein represents the expectation value of the queue delay and is used as a measure of future queue delay. As with the OQD, a QDE is computed in the preferred embodiment for each priority level of each of the ingress queues of each of the ingress blades. The QDE is preferably computed from a statistical weighted average of a plurality of PDU segments received from a given ingress queue of a given priority level within a predetermined expectation interval.

In addition to the OQD, the switching device 140 also employs a target queue delay (TQD) 507 representing the queue delay that one would observe if and when the queue scheduling schema was able to accommodate current traffic conditions and meet or exceed policy QoS objectives. A TQD in the preferred embodiment may be defined for each priority level of an ingress queue memory 242. The TQD corresponds to the maximum delay or latency that the given priority level should experience in order to maintain the desired QoS as defined by the one or more policy rules provided by the network administrator.

As illustrated in the comparison step 506, the OQD and TQD are compared for purposes of determining whether to enable fragmentation at a particular priority queue of an ingress blade. In some embodiments, the determination of whether to enable fragmentation may be based on one or more additional estimators including the bandwidth and delay generated as a function of the bandwidth and delay variation observed for every flow using a moving average, low pass filter, or adaptive filter, for example. A threshold can be defined for each of these estimators which, when exceeded, will cause fragmentation to be enabled for an associated flow.

If it is determined in the QoS assurance testing step 508 that the OQD for a particular priority level is greater than the TQD, the switching device takes steps to mitigate the queue delay. In the preferred embodiment, the switching device 140 uses the inter-blade PDU fragmentation operation to reduce the bandwidth consumed by one or more ingress queues. The fragmentation is generally applied to one or more priority level queues that consume an excessive or disproportionate quantity of bandwidth at the ingress blade of the priority level queue being "starved." The one or more offending queues are determined in identifying step 510 for purposes of enabling the corresponding fragmentation module.

If the fragmentation module is not enabled, as determined in fragmentation enabled testing step 512, the ingress switching device is directly or indirectly signaled and the fragmentation module enabled (step 514) for one or more priority queues. If the fragmentation module was previously enabled for the one or more priority queues and the target queue delay still not satisfied, the fragmentation module in some embodiments is adapted to further reduce the maximum fragmentation size (step 516). The size of the PDU fragment may be reduced in one or more increments from a relatively high maximum PDU fragment size until a relatively low maximum fragmentation size is attained.

If the OQD is less than or equal to the TQD (step 508), the egress switching device 140 proceeds to determine in disable fragmentation testing step 518 whether it is necessary to disable any previously priority queues for which the fragmentation module had been enabled. If the OQD is substantially smaller than the TQD, for example, the fragmentation module may be disabled (step 520) for one or more priority queues at which fragmentation was implemented. In some embodiments, the maximum PDU fragmentation size may be increased prior to entirely disabling the fragmentation module.

Figure 6A:
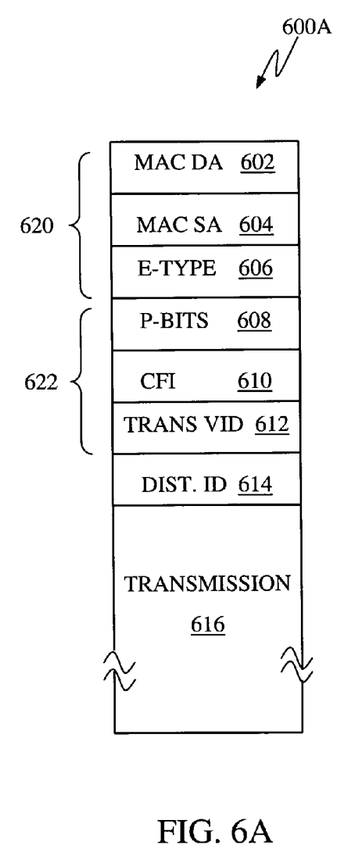
FIG. 6A is an exemplary inter-module header used to label PDUs and PDU fragments in between switching devices, according to the preferred embodiment of the present invention.

Illustrated in FIG. 6A is an exemplary inter-module header used to label PDUs and PDU fragments in between switching devices. The inter-module header, present only within the switch 100, comprises an internal Ethernet header 620, an internal VLAN header 622, and distribution identifier 614. The inter-module header 600A is appended to a PDU segment, i.e. a PDU or PDU fragment, during transit from an ingress switching device to an egress switching device.

The internal Ethernet header 620 comprises an internal media access control (MAC) source 604, internal MAC destination 602, and Ethernet type 606 used internally amongst the switching module 140 and the one or more other switching modules operatively coupled to the switching fabric 150. The internal Ethernet header 620 is preferably stripped from the PDU prior to transmission from the egress port and prior to reassembly of the PDU fragment.

The internal VLAN header 622 comprises a priority field, i.e. P-bits 608, correlated to the class of service (CoS) used to distinguish traffic types, a canonical format indicator (CFI) field 610, and a transit VLAN ID field 612 with a unique value to indicate the presence of the distribution identifier 614.

Figure 6B:
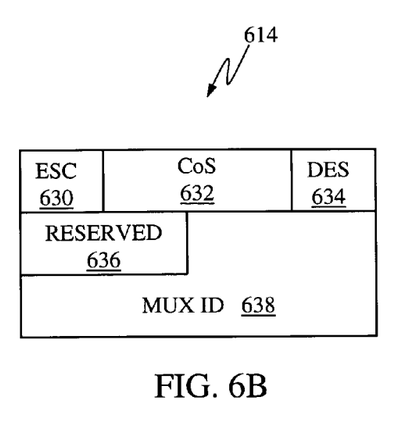
FIG. 6B is a distribution identifier, according to the preferred embodiment of the present invention.

The distribution identifier of the preferred embodiment, illustrated in more detail in FIG. 6B, comprises an ESC field 630, CoS field 632, DES field 634, and multiplexor identifier

638. The ESC field indicates the presence of one or more additional distribution identifiers, thereby allowing more information to be embedded per frame. The CoS field 632 defines a class of service which the egress switching module may, but need not necessarily include in the outbound packet. The DES field 634, representing the discard eligibility, indicates to the egress switching module that the particular segment may be preferentially dropped by the inbound processor. Although the DES field 634 and CoS field 632 are represented in what appear to be independent fields, they are usually highly correlated, in practice.

Figure 6C:
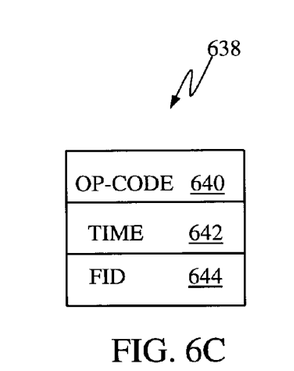
FIG. 6C is a multiplexor identifier, according to the preferred embodiment of the present invention.

The multiplexor identifier 638, illustrated in detail in FIG. 6C, contains the core control fields used by an ingress switch module to convey instructions for assembling fragmented PDUs and used by an egress switch module to determine the inter-switch module transit time. In particular, the multiplexor identifier 638 comprises a fragmentation operation code 640 selected from a specific set of remote procedural primitives that define instructions for reconstructing the PDU or PDU fragment at the egress switching module. The multiplexor identifier 638 further comprises a fragment identifier 644 or pointer thereto that identifies the fragment for purposes of reconstructing the original PDU, and a timestamp 642 appended to the PDU segment at the ingress switching module.

One skilled in the art will appreciate that the contents of the inter-module header may also be incorporated into one or more test packets for purposes of providing signaling and/or control between switching devices. The test packets may be communicated in-band with packet data or out-of-band using dedicated control lines.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A bandwidth provisioning method based on one or more quality of service levels (QoS), defined by one or more policies governing the transmission of protocol data units through a plurality of switching devices comprising the steps of:
   (a) appending an inter-switching device label comprising a timestamp to the protocol data unit (PDU) segment at a first switching device, the first switching device comprising a plurality of queues characterized by one or more QoS properties;
   (b) buffering the PDU segment in one of the plurality of queues;
   (c) conveying the PDU segment to a second switching device;
   (d) determining via a fragmentation module to parse the PDU into fragments based on priority queues associated with a different level of priority with a unique QoS, wherein a plurality of QoS policies are applied, the plurality of QoS policies including bandwidth requirements, maximum jitter, queue delay, transit delay, preference and frequency with which a packet is distributed to the switch fabric;
   (i) determining, using the timestamp, an observed delay for the PDU segment to propagate between the first switching device and the second switching device; and
   (ii) altering at least one of the one or more QoS properties from the second switching device depending on the observed delay.

2. The bandwidth provisioning method of claim 1, wherein the plurality of queues comprise a plurality of ingress queues, the ingress characterized by QoS properties, the QoS properties comprising one or more queuing properties.

3. The bandwidth provisioning method of claim 2, wherein one of the queuing properties is the size of the PDU segment.

4. The bandwidth provisioning method of claim 3, wherein the step of altering one or more queuing properties comprises the step of enabling parsing of at least one PDU into a plurality of PDU fragments.

5. The bandwidth provisioning method of claim 4, wherein the method further comprises the steps of:
   (a) removing the QoS label at the second switching device; and
   (b) reassembling, at the second switching device, the plurality of PDU fragments into at least one original PDU.

6. The bandwidth provisioning method of claim 4, wherein the step of altering one or more queuing properties comprises the step of defining a maximum fragmentation size into which the at least one PDU is fragmented.

7. The bandwidth provisioning method of claim 6, wherein the step of defining a maximum fragmentation size comprises the step of reducing the maximum fragmentation size associated with one or more ingress queues of the plurality of ingress queues when at least one or more other ingress queues is congested.

8. The bandwidth provisioning method of claim 1, wherein the step of altering one or more QoS properties comprises the step of enabling fragmentation of one or more PDUs at the plurality of queues if the observed delay exceeds a target delay associated with the propagation through the plurality of queues.

9. The bandwidth provisioning method of claim 8, wherein the one or more QoS properties comprise a fragmentation property defining whether to fragment one or more PDUs of one or more traffic flows.

10. The bandwidth provisioning method of claim 8, wherein the one or more QoS properties comprise a fragmentation property defining whether to fragment one or more PDUs of one or more queues.

11. The bandwidth provisioning method of claim 8, wherein the one or more queuing properties comprise a fragmentation property defining whether to fragment a PDU after transmission from the associated queue to a switch fabric has begun but before transmission is completed.

12. The bandwidth provisioning method of claim 1, wherein the PDU segment is a protocol data unit.

13. The bandwidth provisioning method of claim 1, wherein the PDU segment is a PDU fragment.

14. The bandwidth provisioning method of claim 13, wherein the inter-switching device label further comprises a fragment identifier.

15. The bandwidth provisioning method of claim 13, wherein the inter-switching device label further comprises an operation code comprising one or more instructions to the second switching device for processing the PDU fragment.

16. The bandwidth provisioning method of claim 1, wherein the step of altering at least one of the one or more QoS properties comprises altering one or more filtering properties; and wherein the method further comprises the step of filtering one or more segments of a traffic flow at the first switching device.

17. The bandwidth provisioning method of claim 1, wherein the step of altering at least one of the one or more QoS properties comprises altering one or more shaping properties, and wherein the method further comprises the steps of shaping one or more segments of a traffic flow at the first switching device.

18. A bandwidth provisioning apparatus comprising an ingress queue memory associated with a different level of priority and correlates one or more quality of service levels (QoS) governing the transmission of protocol data units through a plurality of switching devices, the apparatus comprising:

(a) a first switching device, comprising a plurality of queues characterized by one or more QoS properties, for appending an internal label, the internal label comprising a timestamp to one or more PDU segments;

(b) a fragmentation module adapted to parse select ingress PDUs into one or more PDU fragments when one or more queues are adversely impacted due to high bandwidth consumption at one or more other ingress priority queues; and (c) second switching device, operatively coupled to the first switching device, for:

(i) determining a delay time for the one or more PDU segments to propagate between the first switching device and the second switching device based on the timestamp; and (ii) altering the one or more QoS properties depending on the time delay.

19. The bandwidth provisioning apparatus of claim 18, wherein the step of altering one or more QoS properties comprises the step of enabling parsing of one or more PDUs into a plurality of PDU fragments.

20. The bandwidth provisioning apparatus of claim 19, wherein the second switching device is adapted for:

(a) removing the internal label from each of the one or more PDU segments; and (b) reassembling the plurality of PDU fragments into at least one PDU.

21. The bandwidth provisioning apparatus of claim 18, wherein the internal label further comprises a fragment operation code comprising one or more instructions to the second switching device for processing the PDU fragment.

22. The bandwidth provisioning apparatus of claim 18, wherein the first switching device, comprising a plurality of ingress queues, is adapted to generate a maximum fragment size for one or more PDU segments transmitted from at least one of the plurality of ingress queues.

23. The bandwidth provisioning method of claim 18, wherein the first switching device, comprising a plurality of ingress queues, is adapted to fragment one or more PDUs into fragments at the first switching device if the delay time exceeds a target delay.

* * * * *

UNITED STATES PATENT AND TRADEMARK OFFICE
CERTIFICATE OF CORRECTION

PATENT NO. : 7,631,096 B1 Page 1 of 1
APPLICATION NO. : 10/684772
DATED : December 8, 2009
INVENTOR(S) : Yeh et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1818 days.

Signed and Sealed this

Twenty-first Day of December, 2010

David J. Kappos
*Director of the United States Patent and Trademark Office*